(12) United States Patent
Owyang

(10) Patent No.: US 9,329,359 B2
(45) Date of Patent: May 3, 2016

(54) MIRROR ASSEMBLY FOR A VEHICLE

(71) Applicant: Mon Spencer Owyang, Watsonville, CA (US)

(72) Inventor: Mon Spencer Owyang, Watsonville, CA (US)

( * ) Notice: Subject to any disclaimer, the term of this patent is extended or adjusted under 35 U.S.C. 154(b) by 10 days.

(21) Appl. No.: 14/480,924

(22) Filed: Sep. 9, 2014

(65) Prior Publication Data

US 2016/0070084 A1        Mar. 10, 2016

(51) Int. Cl.
*G02B 7/18* (2006.01)
*G02B 7/182* (2006.01)
*B62J 29/00* (2006.01)

(52) U.S. Cl.
CPC ......... *G02B 7/182* (2013.01); *B62J 29/00* (2013.01)

(58) Field of Classification Search
CPC .... B62J 29/00; B62J 2099/0033; G02B 5/08; G02B 7/18; G02B 7/182; B60R 1/081; B60R 1/082; Y10T 74/2078
USPC .................. 359/842, 872; 74/551.1, 551.8
See application file for complete search history.

(56) References Cited

U.S. PATENT DOCUMENTS

| | | |
|---|---|---|
| 1,528,827 A | 3/1925 | Hapgood |
| 1,537,039 A | 5/1925 | Short |
| 1,631,038 A | 5/1927 | Hodny et al. |
| 2,302,560 A | 11/1942 | Latona |
| 3,756,017 A | 9/1973 | Genta |
| 4,054,375 A | 10/1977 | Ribeca |
| 5,555,137 A | 9/1996 | Whiting |
| 2002/0067557 A1* | 6/2002 | Coleburn ............... B60R 1/082 359/842 |
| 2013/0026512 A1 | 1/2013 | Tsai |

* cited by examiner

*Primary Examiner* — Euncha Cherry
(74) *Attorney, Agent, or Firm* — Roeder & Broder LLP; James P. Broder

(57) ABSTRACT

A mirror housing is configured to retain a mirror unit including (i) a mirror having a perimeter, and (ii) a resilient member that contacts the perimeter of the mirror. The mirror housing comprises a first housing member including a member back and a first member edge, and a second housing member including a second member edge that is removably secured to the member back of the first housing member. The first housing member selectively receives the mirror unit substantially adjacent to the member back, with the first member edge contacting at least approximately 25% of an outer surface of the resilient member. The second housing member also contacts at least approximately 25% of the outer surface of the resilient member to impart a force on the resilient member against the first member edge to inhibit movement of the mirror unit relative to the mirror housing.

21 Claims, 6 Drawing Sheets

MIRROR ASSEMBLY FOR A VEHICLE

BACKGROUND

Recreational riding and competitive racing of two- and four-wheeled vehicles such as bicycles, motorcycles and all-terrain vehicles has become increasingly popular in recent years. Riders and drivers (also sometimes generically referred to herein as "users") place great value on the ease and cost-efficiency of replacing old, broken or non-functional mechanical components on their vehicles. Certain components, such as side view or rear view mirror assemblies, are subject to shattering, cracking, hazing, distorting or other functional issues. Replacement of these types of mirrors, when necessary to do so, can be difficult, time-consuming and costly without the proper, specific required tools and skill.

Additionally, manufacturing of conventional mirror assemblies can be somewhat complicated and technically awkward. More specifically, positioning and assembling of the mirror into a mirror housing can be a fairly challenging, delicate operation. This process can often result in breakage of the mirror, particularly with typical mirror assemblies.

SUMMARY

The present invention is directed toward a mirror housing that is configured to retain a mirror unit, the mirror unit including (i) a mirror having a perimeter, and (ii) a resilient member having an inner surface that contacts a majority of the perimeter of the mirror, and an opposing outer surface. In certain embodiments, the mirror housing comprises a first housing member and a second housing member. The first housing member includes a member back and a first member edge that are formed with one another as a unitary structure. Additionally, the first housing member is configured to selectively receive the mirror unit substantially adjacent to the member back, with the first member edge being adapted to contact at least approximately 25% of the outer surface of the resilient member. The second housing member is removably secured to the member back of the first housing member. The second housing member includes a second member edge that is configured to contact at least approximately 25% of the outer surface of the resilient member to impart a force on the resilient member against the first member edge to inhibit movement of the mirror unit relative to the mirror housing.

With this design, as provided in detail herein, the user is able to quickly and easily remove and/or replace the mirror unit and/or the mirror in a cost-efficient manner when the mirror is damaged, loses appropriate functionality, or when it is otherwise desired to take such actions.

In some embodiments, the first member edge is adapted to contact approximately 50% of the outer surface of the resilient member. In one such embodiment, the second member edge is also adapted to contact approximately 50% of the outer surface of the resilient member when the second housing member is secured to the first housing member.

Additionally, in one embodiment, the member back of the first housing member includes a housing back aperture and the second housing member includes a second member aperture. In such embodiment, the mirror housing can further comprise a fastener that extends through the second member aperture and the housing back aperture to secure the second housing member to the member back of the first housing member.

In certain variations to the present invention, the second housing member can be pivotally connected to the first housing member and/or one or both of the member edges can have a generally semi-circular shape.

The present invention is further directed toward a mirror assembly comprising (i) a mirror including a front side having a reflective surface, an opposed rear side, and a perimeter; (ii) a resilient member including an inner surface that contacts a majority of the perimeter of the mirror, and an opposing outer surface; and the mirror housing as described above that retains the mirror and the resilient member. Additionally and/or alternatively, the inner surface of the resilient member can contact substantially the entire perimeter of the mirror.

Additionally, in one embodiment, the first member edge includes a first flange such that at least a portion of the resilient member is positioned between the first flange and the member back when the mirror is positioned substantially within the mirror housing. In such embodiment, the second member edge can also include a second flange such that at least a portion of the resilient member is positioned between the second flange and the member back when the mirror is positioned substantially within the mirror housing.

The present invention is further directed toward a vehicle including a handlebar and the mirror assembly as described above that is coupled to the handlebar.

In another application, the present invention is directed toward a mirror housing that is adapted to receive and retain a mirror unit, the mirror unit including (i) a mirror having a perimeter, and (ii) a resilient member having an inner surface that contacts a majority of the perimeter of the mirror, and an opposing outer surface, the mirror housing comprising (A) a first housing member that receives the mirror unit, the first housing member including a first member edge that is configured to contact at least approximately 25% of the outer surface of the resilient member; and (B) a second housing member including a second member edge that is configured to contact at least approximately 25% of the outer surface of the resilient member to impart a force on the resilient member against the first member edge to inhibit movement of the mirror unit relative to the mirror housing.

Additionally, in still another application, the present invention is further directed toward a mirror assembly comprising (A) a mirror unit including (i) a mirror having a front side with a reflective surface, an opposed rear side, and a perimeter, and (ii) a resilient member including an inner surface that contacts substantially the entire perimeter of the mirror, and an opposing outer surface; (B) a first housing member including a member back and a first member edge that are formed with one another as a unitary structure, the first housing member being configured to selectively receive the mirror unit substantially adjacent to the member back, the first member edge including a first flange such that at least a portion of the resilient member is positioned between the first flange and the member back when the mirror is positioned substantially within the mirror housing, the first member edge being adapted to contact approximately 50% of the outer surface of the resilient member; and (C) a second housing member that is removably secured to the member back of the first housing member, the second housing member including a second member edge that includes a second flange such that at least a portion of the resilient member is positioned between the second flange and the member back when the mirror is positioned substantially within the mirror housing, the second member edge being configured to contact at least approximately 50% of the outer surface of the resilient member to impart a force on the resilient member against the first member edge to inhibit movement of the mirror unit relative to the mirror housing.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. For example, although the present invention is illustrated and described in relation to use with a motorcycle, the present invention is equally applicable in other types of vehicles (e.g., all-terrain vehicles (ATVs), bicycles, etc.) that utilize rear view or side view mirrors. Furthermore, in the following description of embodiments, numerous specific details are set forth in order to provide a thorough understanding of embodiments of the subject matter. However, embodiments may be practiced without these specific details. In other instances, well known methods, procedures and components have not been described in detail so as to not unnecessarily obscure aspects of the described embodiments.

As an overview, the present invention is directed toward a mirror assembly 10 for a vehicle 12, e.g., a motorcycle, ATV, bicycle or any other vehicle that uses a mirror 222 (illustrated in FIG. 2) for allowing a user to see objects in a direction other than that which the user is looking. In particular, the present invention is directed toward a mirror assembly 10 including a mirror 222, e.g., a side view mirror or a rear view mirror, as non-exclusive examples, that can be quickly and easily removed and/or replaced in a cost-efficient manner when the mirror 222 becomes damaged, loses proper functionality, or when the user otherwise desires to replace the mirror 222.

Figure 1:
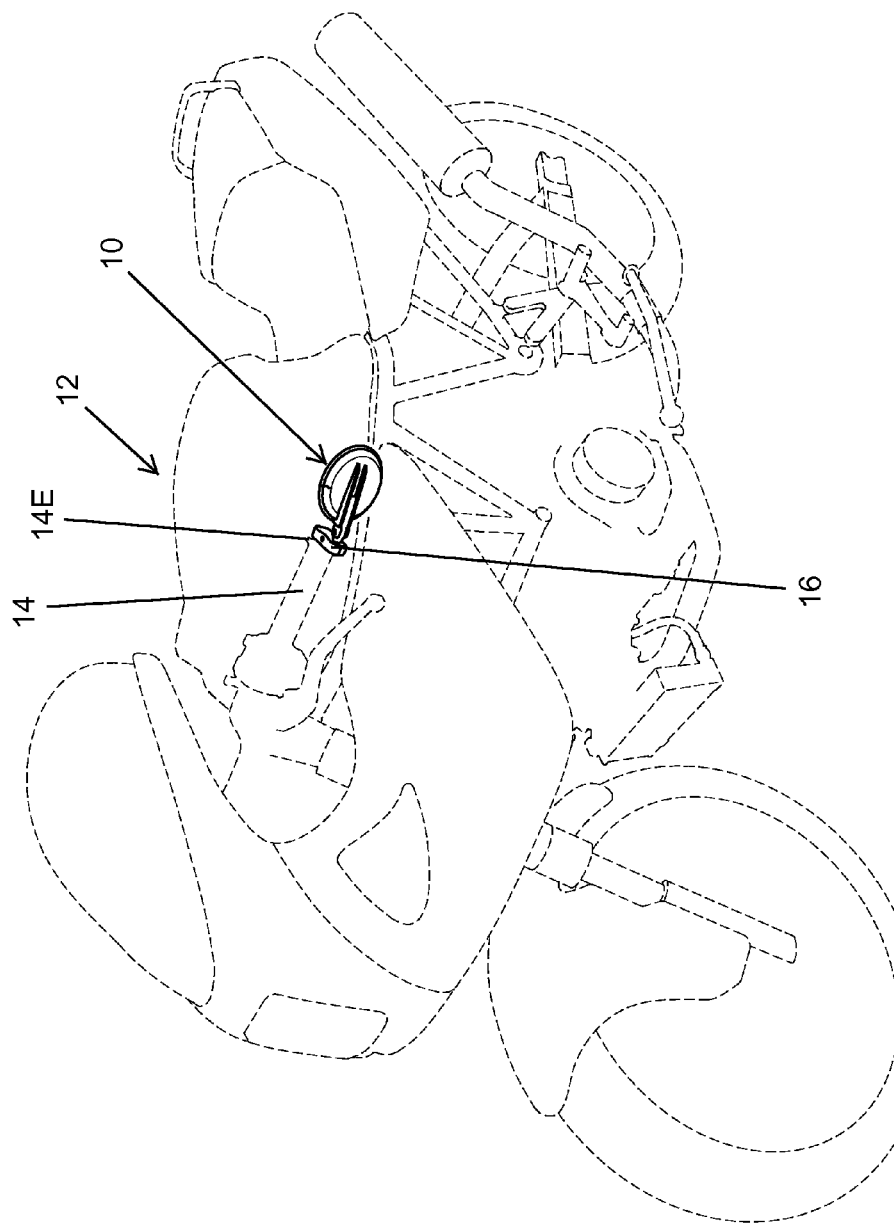
FIG. 1 is a perspective view of a vehicle and one embodiment of a mirror assembly having features of the present invention.

FIG. 1 is a perspective view of the vehicle 12, and one embodiment of the mirror assembly 10 having features of the present invention. As illustrated, the vehicle 12 can include a handlebar 14, and the mirror assembly 10 can be movably coupled to the handlebar 14. More particularly, as shown, the mirror assembly 10 can include a connector assembly 16 for movably and/or adjustably coupling the mirror assembly 10 to the vehicle 12. In one embodiment, the connector assembly 16 can be utilized for movably and/or adjustably coupling the mirror assembly 10 to the handlebar 14, e.g., to a distal end 14E of the handlebar 14. With this design, as the user moves and/or adjusts the position of the handlebar 14, e.g., during turning and/or maneuvering of the vehicle 10, the mirror assembly 10 can be maintained in an appropriate and functional position for the user at all times. Alternatively, the mirror assembly 10 can be coupled to a different part of the handlebar 14 and/or to a different part of the vehicle 12. It should be appreciated that the connector assembly 16 can be coupled to the vehicle 12 in any suitable manner.

Figure 2:
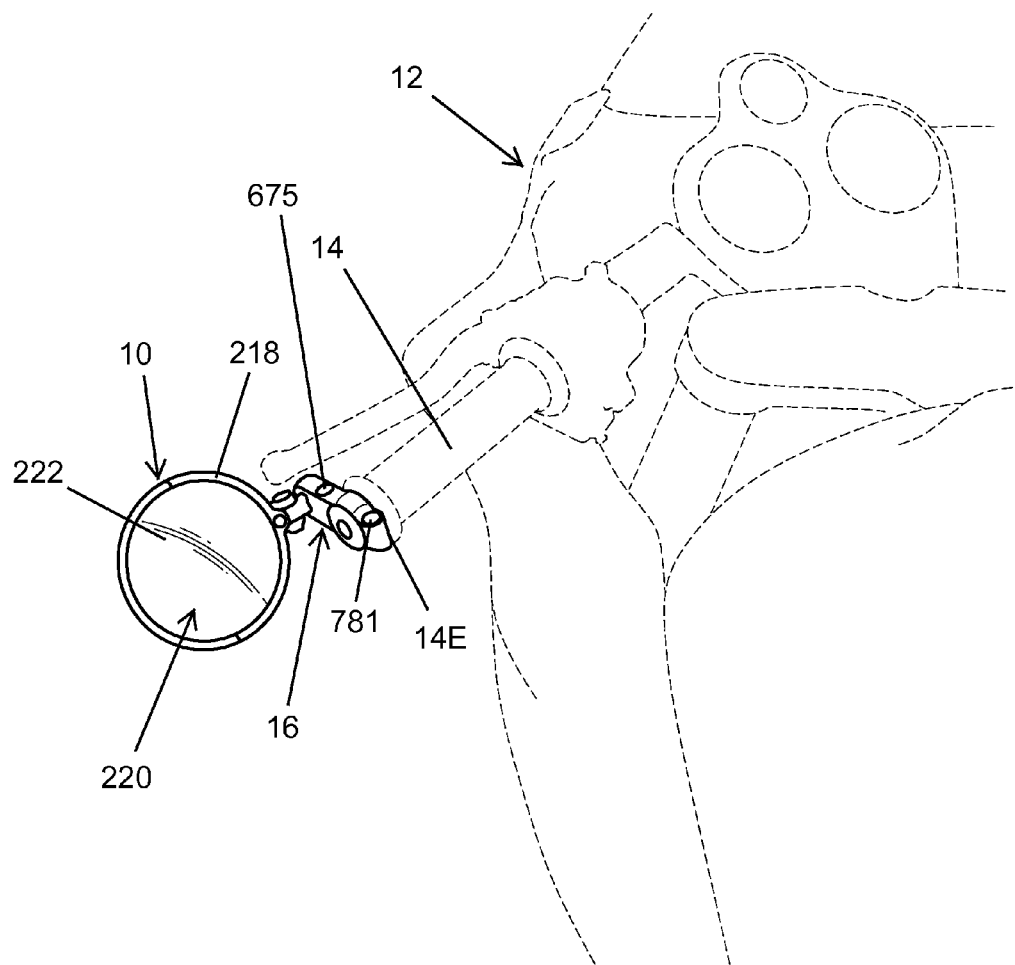
FIG. 2 is a perspective view of a portion of the vehicle and the mirror assembly illustrated in FIG. 1, the mirror assembly including a mirror housing and a mirror unit.

FIG. 2 is a perspective view of a portion of the vehicle 12, including the handlebar 14, and a front perspective view of the mirror assembly 10 illustrated in FIG. 1. The design of the mirror assembly 10 can be varied. As shown in this embodiment, the mirror assembly 10 includes a mirror housing 218; a mirror unit 220 that is selectively received and/or retained within the mirror housing 218, the mirror unit 220 including the mirror 222; and the connector assembly 16 for movably and/or adjustably coupling the mirror assembly 10 to the vehicle 12, e.g., to the distal end 14E of the handlebar 14. During use, the user can adjustably position the mirror 222, i.e. with the connector assembly 16, such that the user can have the best and most complete view for seeing objects that are behind the user, to the side of the user, and/or in any other direction other than that which the user is looking. Additionally, as provided herein, the mirror housing 218 is configured to enable the user to quickly and easily remove and/or replace the mirror unit 220 and/or the mirror 222 in a cost-efficient manner, when removal or replacement of the mirror unit 220 is necessary or desired.

Figures 3A, 3B:
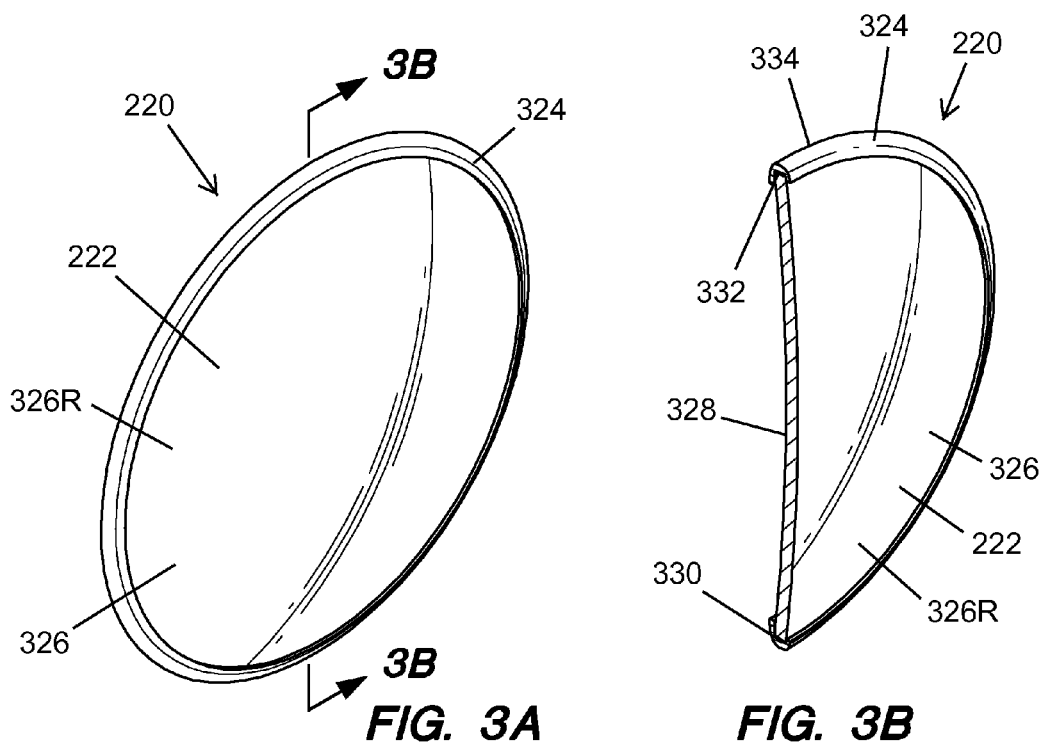
FIG. 3A is a perspective view of one embodiment of the mirror unit.
FIG. 3B is a cross-sectional view of the mirror unit taken at line 3B-3B in FIG. 3A.

FIG. 3A is a perspective view of one embodiment of the mirror unit 220. Additionally, FIG. 3B is a cross-sectional view of the mirror unit 220 taken at line 3B-3B in FIG. 3A. The design of the mirror unit 220 can be varied to suit the specific requirements of the mirror assembly 10. For example, in the embodiment illustrated in FIGS. 3A and 3B, the mirror unit 220 includes the mirror 222 and a resilient member 324.

As shown in this embodiment, the mirror 222 is substantially circular-shaped and has a convex mirror design. Alternatively, the mirror 222 can be another suitable shape and/or the mirror 222 can have other than a convex mirror design. For example, in certain non-exclusive alternative embodiments, the mirror 222 can be substantially square-shaped, rectangle-shaped, oval-shaped, hexagon-shaped, octagon-shaped, or another suitable shape, and/or the mirror 222 can have a substantially flat mirror design.

Additionally, as illustrated, the mirror 222 includes a front side 326 having a reflective surface 326R, an opposed rear side 328 (illustrated in FIG. 3B), and a perimeter 330 (illustrated in FIG. 3B).

Further, in this embodiment, the resilient member 324 is positioned adjacent to the perimeter 330 of the mirror 222. The design of the resilient member 324 can be varied to suit the specific requirements of the mirror 222, the mirror unit 220 and/or the mirror assembly 10. As shown in FIG. 3B, the resilient member 324 can be a substantially U-shaped gasket (i.e. having a substantially U-shaped cross-section) made from a resilient material, e.g., rubber or another suitable resilient material. In this embodiment, the resilient member 324 has an inner surface 332 that is shaped to contact the perimeter 330 of the mirror 222, and an opposed outer surface 334 that faces away from the mirror 222. In some embodiments, the inner surface 332 of the resilient member 324 can be shaped and/or positioned to contact at least a majority of the perimeter 330 of the mirror 222. For example, in non-exclusive alternative embodiments, the resilient member 324 can be shaped and/or positioned such that the inner surface 332 of the resilient member 324 contacts greater than 50%, 75%, 90%, or substantially the entire, if not completely the entire, perimeter 330 of the mirror 222. Alternatively, the resilient member 324 can have a different shape and/or the resilient member 324 can be positioned in a different manner relative to the mirror 222.

Figure 4:
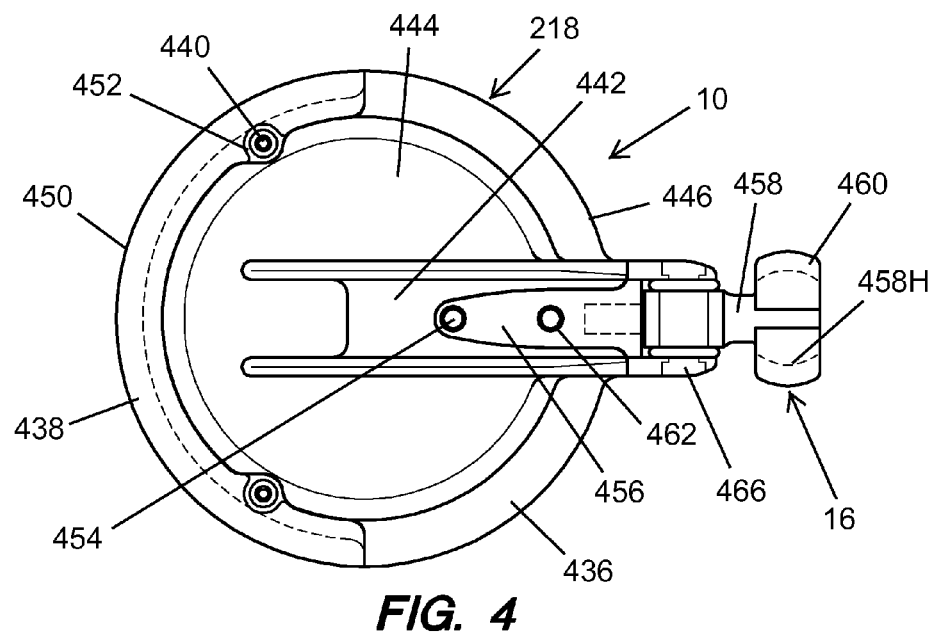
FIG. 4 is a rear view of the mirror assembly illustrated in FIG. 1 including the mirror housing.

FIG. 4 is a rear view of the mirror assembly 10 illustrated in FIG. 1. In particular, FIG. 4 illustrates certain features and aspects of the mirror housing 218 and the connector assembly 16.

The design of the mirror housing 218 can be varied to suit the specific requirements of the mirror assembly 10. In this embodiment, as shown in FIG. 4, the mirror housing 218 includes a first housing member 436, a second housing member 438, one or more fasteners 440 for selectively and/or removably securing the first housing member 436 to the second housing member 438, and a mounting frame 442.

The first housing member 436 is configured to receive and retain at least a portion of the mirror unit 220 (illustrated in FIG. 3A). In this embodiment, the first housing member 436 includes a member back 444 and a first member edge 446. In one embodiment, the member back 444 and the first member edge 446 can be integrally formed with one another as a unitary structure. With this design, the first housing member 436 can have greater overall structural integrity. Alternatively, the member back 444 and the first member edge 446 can be formed separately from one another and can then be fixedly secured to one another.

Figure 6:
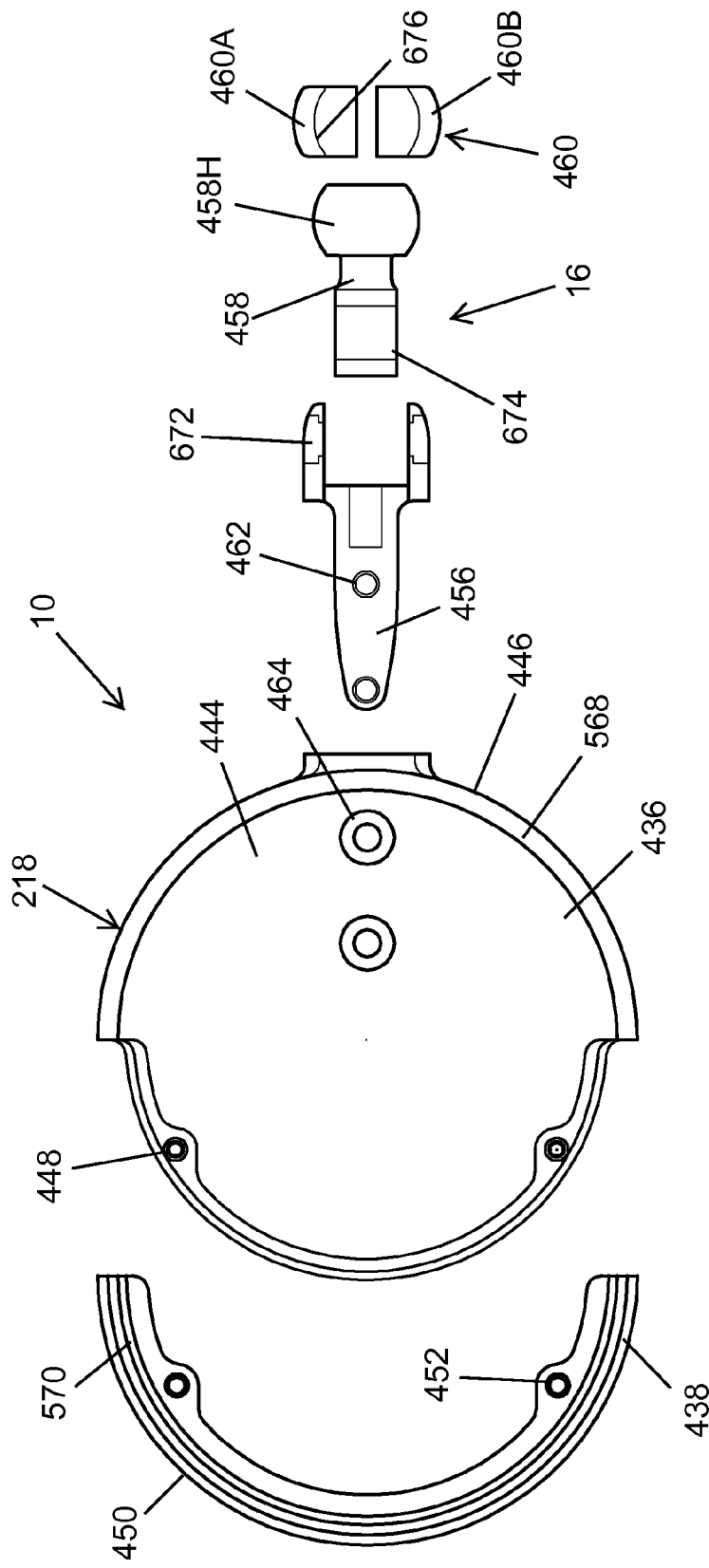
FIG. 6 is a front exploded view of a portion of the mirror assembly.

In one embodiment, the member back 444 can have a substantially flat, disk-shaped design that matches the general circular shape of the mirror 222 (illustrated in FIG. 3A) and/or the mirror unit 220. Alternatively, the member back 444 can have another suitable shape depending on the specific design of the mirror 222 and/or the mirror unit 220. Additionally, the member back 444 can include at least one housing back aperture 448 (two are illustrated in FIG. 6).

The first member edge 446 is configured to contact at least a portion of the outer surface 334 (illustrated in FIG. 3A) of the resilient member 324 (illustrated in FIG. 3A). For example, in one embodiment, the first member edge 446 can be configured to contact at least approximately twenty-five percent (25%) of the outer surface 334 of the resilient member 324. Alternatively, in one embodiment, the first member edge 446 can be configured to contact approximately fifty percent (50%) of the outer surface 334 of the resilient member 324.

Further, in one embodiment, the first member edge 446 can have a generally semi-circular shape to match a portion of the general circular shape of the mirror 222 and/or the mirror unit 220. Alternatively, the first member edge 446 can have another suitable shape depending on the specific design of the mirror 222 and/or the mirror unit 220.

The second housing member 438 is also configured to receive and retain at least a portion of the mirror unit 220. In this embodiment, the second housing member 438 includes a second member edge 450. The second member edge 450 is configured to contact at least a portion of the outer surface 334 of the resilient member 324 to impart a force on the resilient member 324 against the first member edge 446 to inhibit movement of the mirror unit 220 relative to the mirror housing 218. For example, in one embodiment, the second member edge 450 can be configured to contact at least approximately twenty-five percent (25%) of the outer surface 334 of the resilient member 324. Alternatively, in one embodiment, the second member edge 450 can be configured to contact approximately fifty percent (50%) of the outer surface 334 of the resilient member 324.

Additionally, in one embodiment, the second member edge 450 can have a generally semi-circular shape to match a portion of the general circular shape of the mirror 222 and/or the mirror unit 220. Alternatively, the second member edge 450 can have another suitable shape depending on the specific design of the mirror 222 and/or the mirror unit 220.

Further, in this embodiment, the second member edge 450 can include at least one second member aperture 452 (two are illustrated in FIG. 4).

As noted above, in this embodiment, the mirror housing 218 includes one or more fasteners 440, e.g., screws, for selectively and/or removably securing the first housing member 436 to the second housing member 438, i.e. such that the mirror unit 220 can be effectively and secured retained therebetween. More particularly, as shown, the mirror housing 218 includes two fasteners 440 for selectively and/or removably securing the first housing member 436 to the second housing member 438. Alternatively, the mirror housing 218 can include greater than or fewer than two fasteners 440.

During use, when it is desired to secure the second housing member 438 to the first housing member 436, i.e. to secure the mirror unit 220 therebetween, the second housing member 438 can be aligned relative to the first housing member 436 such that each of the at least one second member apertures 452 is aligned with one of the at least one housing back apertures 448. Additionally, a separate fastener 440 can be extended, e.g., threaded, into and/or through each of the second member apertures 452 and the corresponding housing back aperture 448. Subsequently, when it is desired to remove the mirror unit 220 from the mirror housing 218, one or more of the fasteners 440 can be removed to enable the second housing member 438 to move relative to the first housing member 436. With this design, the second housing member 438 can be selectively and/or removably secured to the member back 444 of the first housing member 436. For example, in one embodiment, each of the fasteners 440 can be selectively fastened and unfastened so that the second housing member 438 can be completely removed from the first housing member 436. Alternatively, in another embodiment, one of the fasteners 440 can remain in position so that the second housing member 438 is pivotally connected to the first housing member 436.

The mounting frame 442, which can be of any suitable design, is configured for coupling the connector assembly 16 to the mirror housing 218. In particular, in certain embodiments, the mounting frame 442 can be mounted on, secured to and/or integrally formed with the member back 444 of the first housing member 436. The connector assembly 16 can then be fixedly secured to the mounting frame 442, and thus the mirror housing 218, with one or more connector fasteners 454 (two are illustrated in FIG. 4).

As noted above, the connector assembly 16 is configured for movably and/or adjustably coupling the mirror assembly 10 to the vehicle 12 (illustrated in FIG. 1), e.g., to the handlebar 14 (illustrated in FIG. 1) of the vehicle 12. The design of the connector assembly 16 can be varied to suit the requirements of the mirror assembly 10. In this embodiment, the connector assembly 16 includes a connector base 456, a first adjustable connector member 458 (illustrated partially in phantom) and a second adjustable connector member 460.

Alternatively, the connector assembly 16 can have greater or fewer components than those specifically illustrated and described herein.

In this embodiment, the connector base 456 is fixedly secured to the mounting frame 442 of the mirror housing 218. More specifically, as shown, the connector base 456 includes one or more base apertures 462 (two are illustrated in FIG. 4) such that each of the base apertures 462 can be selectively aligned with a back connector aperture 464 (illustrated in FIG. 5B) in the member back 444 of the first housing member 436. When the base apertures 462 and the back connector apertures 464 are aligned in this manner, a separate connector fastener 454, e.g., a screw, can extend into and/or through, e.g., be threaded into and/or through, each of the base apertures 462 and the corresponding back connector aperture 464.

The first adjustable connector member 458 is adjustably, i.e. universally, pivotally and/or rotatably, coupled to the connector base 456. In particular, in one embodiment, a pivot pin 466 can be utilized to pivotally couple the first adjustable connector member 458 to the connector base 456. For example, in such embodiment, the first adjustable connector member 458 can pivot relative to the connector base 456 in a first direction by at least approximately 180 degrees via the pivot pin 466. Alternatively, the first adjustable connector member 458 can pivot relative to the connector base 456 by a greater or lesser amount than at least approximately 180 degrees and/or the first adjustable connector member 458 can be adjustably coupled to the connector base 456 in a different manner. Still alternatively, the first adjustable connector member 458 can be adjusted relative to the connector base 456 in more than the first direction.

Additionally, the second adjustable connector member 460 can be coupled to and can extend between the first adjustable connector member 458 and the vehicle 12, e.g., the handlebar 14 of the vehicle 12 or whatever other component of the vehicle 12 that the mirror assembly 10 may be coupled to. In one embodiment, the second adjustable connector member 460 is adjustably, i.e. universally, pivotally and/or rotatably, coupled to the first adjustable connector member 458 and fixedly secured to the distal end 14E (illustrated in FIG. 2) of the handlebar 14. For example, in such embodiment, the first adjustable connector member 458 can have a member head 458H having the shape of a truncated sphere, and the second adjustable connector member 460 can be selectively clamped about the member head 458H. It should be appreciated that the second adjustable connector member 460 is clamped about the member head 458H tightly enough to maintain the connector members 458, 460 together, but loosely enough to allow for relative movement between the connector members 458, 460. Moreover, the connection between the connector members 458, 460 enables the connector members 458, 460 to be effectively maintained in an infinite number of discrete positions relative to one another along a continuum of movement. With this design, the second adjustable connector member 460 can be simultaneously adjustably positioned relative to the first adjustable connector member 458 by three hundred sixty degrees in a first direction (e.g., about the spherical portion of the member head 458H) and by at least approximately one hundred degrees in a second direction (depending on the amount of truncation of the member head 458H) that is orthogonal to the first direction. Alternatively, the second adjustable connector member 460 can be coupled to the first adjustable connector member 458 in a different manner and/or the connection between the connector members 458, 460 can allow for a different amount of relative movement.

With the adjustability of both adjustable connector members 458, 460 relative to the mirror housing 218 and the handlebar 14, the user has great flexibility in the desired positioning of the mirror unit 220 and the mirror 222 for more optimal use.

Figure 5A:
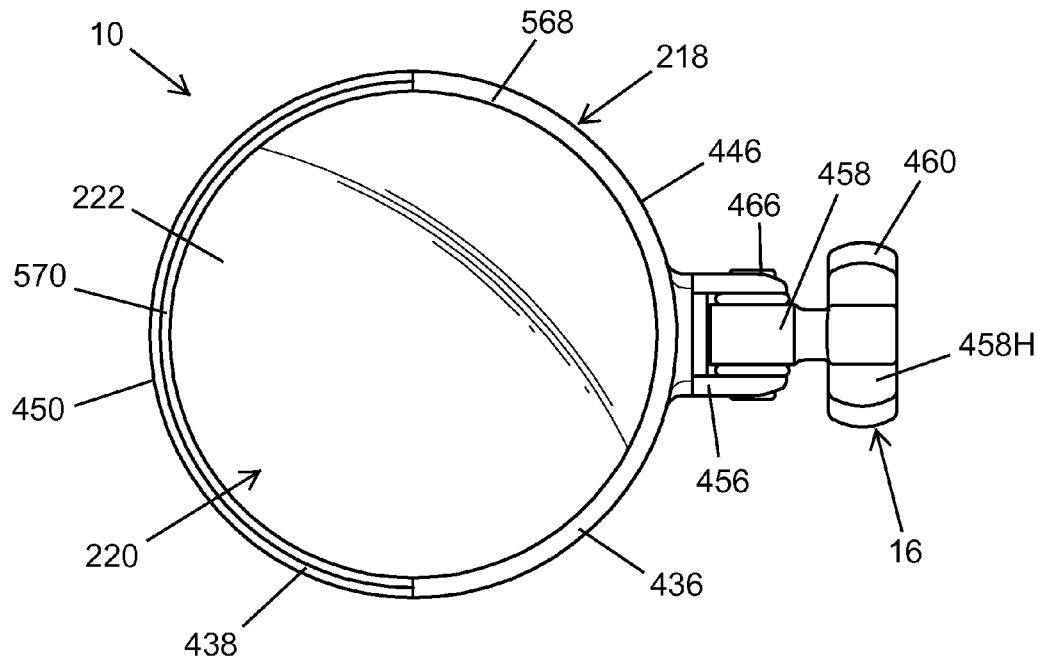
FIG. 5A is a front view of the mirror assembly illustrated in FIG. 1 including the mirror housing and the mirror unit.

FIG. 5A is a front view of the mirror assembly 10 illustrated in FIG. 1. More specifically, FIG. 5A illustrates certain additional features and aspects of the mirror housing 218, the mirror unit 220, and the connector assembly 16. Additionally, FIG. 5B is a front view of a portion of the mirror assembly 10 illustrated in FIG. 5A, with the mirror unit 220 omitted for clarity.

Referring to FIG. 5A, the mirror unit 220 is illustrated as being selectively received and retained within the mirror housing 218. In particular, FIG. 5A illustrates that the first member edge 446 of the first member housing 436 includes a first flange 568 that extends substantially parallel to the member back 444 (illustrated in FIG. 4) such that at least a portion of the resilient member 324 (illustrated in FIG. 3A) of the mirror unit 220 is positioned between the first flange 568 and the member back 444 when the mirror unit 220, and thus the mirror 222, is received and retained within the mirror housing 218. Additionally, FIG. 5A also illustrates that the second member edge 450 of the second housing member 438 includes a second flange 570 that extends substantially parallel to the member back 444 such that at least a portion of the resilient member 324 of the mirror unit 220 is positioned between the second flange 570 and the member back 444 when the mirror unit 220, and thus the mirror 222, is received and retained within the mirror housing 218. It should be appreciated that the specific size of the first flange 568 and the second flange 570 can be varied as desired so long as the flanges 568, 570 are large enough to effectively maintain the positioning of the mirror unit 220 within the mirror housing 218 and small enough not to obscure too much of the mirror 222.

Further, FIG. 5A provides an additional view of the connector assembly 16, i.e. the connector base 456, the first adjustable connector member 458 that is adjustably coupled to the connector base 456 via the pivot pin 466, and the second adjustable connector member 460 that is adjustably coupled to the first adjustable connector member 458, i.e. to the member head 458H of the first adjustable connector member 458.

Figure 5B:
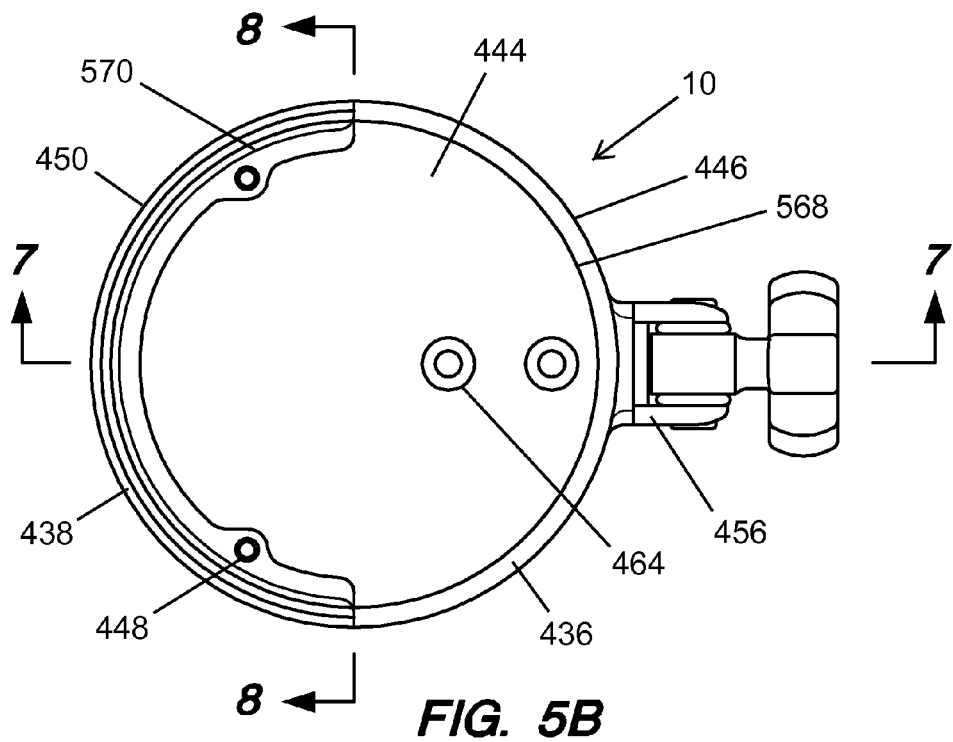
FIG. 5B is a front view of a portion of the mirror assembly illustrated in FIG. 5A, with the mirror unit omitted for clarity.

FIG. 5B illustrates the member back 444 and the first member edge 446, including the first flange 568, of the first housing member 436, and the second member edge 450, including the second flange 570, of the second housing member 438. Additionally, FIG. 5B illustrates the housing back apertures 448 into and/or through which the fasteners 440 (illustrated in FIG. 4) extend (in addition to the corresponding second member apertures 452 (illustrated in FIG. 4)) for purposes of selectively and/or removably securing the second housing member 438 to the first housing member 436. Further, FIG. 5B illustrates the back connector apertures 464 into and/or through which the connector fasteners 454 (illustrated in FIG. 4) extend (in addition to the base apertures 462 (illustrated in FIG. 4)) for purposes of securing the connector base 456 to the mounting frame 442 (illustrated in FIG. 4).

FIG. 6 is a front exploded view of a portion of the mirror assembly 10. More particularly, FIG. 6 is a front exploded view of the mirror housing 218 and the connector assembly 16, with the mirror unit 220, the fasteners 440 and the connector fasteners 454 having been omitted for purposes of clarity.

As described in detail above, the mirror housing 218 includes the first housing member 436 and the second housing member 438. More specifically, as provided above, (i) the first housing member 436 includes the member back 444 and the first member edge 446, including the first flange 568 such that a portion of the mirror unit 220 (illustrated in FIG. 2) is received and retained between the first flange 568 and the member back 444; and (ii) the second housing member 438 includes the second member edge 450, including the second flange 570 such that a portion of the mirror unit 220 is received and retained between the second flange 570 and the member back 444.

Additionally, as shown in this embodiment, the first housing member 436 includes a pair of housing back apertures 448, and the second housing member 438 includes a pair of second member apertures 452. During assembly of the mirror housing 218 and/or the mirror assembly 10, the housing back apertures 448 are aligned with the second member apertures 452 such that each of a pair of fasteners 440 (illustrated in FIG. 4) can be extended, e.g., threaded, into and/or through one of the housing back apertures 448 and the corresponding second member aperture 452. Thus, the first housing member 436 and the second housing member 438 can be selectively and/or removably secured together with the mirror unit 220 effectively secured in position therebetween.

Further, as illustrated in this embodiment, the first housing member 436 includes a pair of back connector apertures 464 that can be aligned with a pair of base apertures 462 of the connector base 456 of the connector assembly 16. When the apertures 462, 464 are thus aligned, each of a pair of connector fasteners 454 (illustrated in FIG. 4) can be extended, e.g., threaded, into and/or through one of the base apertures 462 and the corresponding back connector aperture 464 for purposes of securing the connector assembly 16 to the mirror housing 218.

Additionally, as described in detail above, FIG. 6 illustrates that the connector assembly 16 can include the connector base 456, the first adjustable connector member 458 and the second adjustable connector member 460.

As provided above, the first adjustable connector member 458 can be adjustably coupled to the connector base 456 with the pivot pin 466 (illustrated in FIG. 4), which can extend through base pivot apertures 672 in the connector base 456 and a connector pivot aperture 674 in the first adjustable connector member 458. Alternatively, the first adjustable connector member 458 and the connector base 456 can be adjustably coupled to one another in a different manner.

Further, as provided above, the second adjustable connector member 460 can be adjustably coupled to the member head 458H of the first adjustable connector member 458. More specifically, as shown in FIG. 6, the second adjustable connector member 460 can be formed from two individual member components 460A, 460B that are selectively and adjustably attached to one another with a component connector 675 (illustrated in FIG. 2) such that the second adjustable connector member 460 can be clamped about member head 458H of the first adjustable connector member 458. Moreover, each of the member components 460A, 460B can have an inner surface 676 that is sized and shaped to correspond with the size and shape of the member head 458H to allow for pivotal and/or rotational movement of the second adjustable connector member 460 relative to the first adjustable connector member 458.

Figure 7:
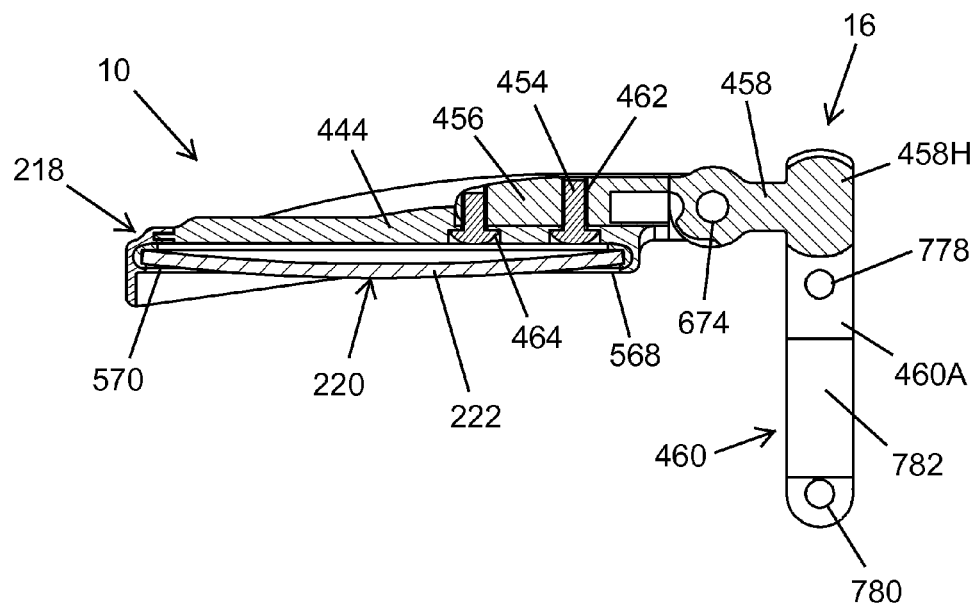
FIG. 7 is a cross-sectional view of the mirror assembly taken at line 7-7 in FIG. 5B.

FIG. 7 is a cross-sectional view of the mirror assembly 10 taken at line 7-7 in FIG. 5B. More particularly, FIG. 7 illustrates in greater detail some of the relative positioning and orientations between various components of the mirror assembly 10, as well as some of the connections and/or couplings between the components. For example, FIG. 7 illustrates the convex shape of the mirror 222, and the positioning and retaining of the mirror unit 220 between the first flange 568 and the member back 444 and between the second flange 570 and the member back 444. FIG. 7 also illustrates how each of the pair of connector fasteners 454 extends into and/or through one of the back connector apertures 464 in the member back 444 and one of the base apertures 462 in the connector base 456 for purposes of securing the connector assembly 16 to the mirror housing 218.

FIG. 7 further illustrates certain features involved in the coupling of the components of the connector assembly 16 to one another, and the coupling of the connector assembly 16 to the vehicle 12 (illustrated in FIG. 1), e.g., to the handlebar 14 (illustrated in FIG. 1) of the vehicle 12. In particular, as shown, the first adjustable connector member 458 includes a connector pivot aperture 674 such that the pivot pin 466 (illustrated in FIG. 4) can extend into and/or through the connector pivot aperture 674 and the pair of base pivot apertures 672 (illustrated in FIG. 6) to enable the first adjustable connector member 458 to pivot relative to the connector base 456. Further, in this embodiment, each of the member components 460A, 460B (only one is shown in FIG. 7) of the second adjustable connector member 460 includes a component connector aperture 778 such that a component connector 675 (illustrated in FIG. 2) can extend into and/or through both of the component connector apertures 778 so that the member components 460A, 460B can be securely and adjustably clamped about the member head 458H of the first adjustable connector member 458. Still further, in this embodiment, each of the member components 460A, 460B also includes a vehicle connector aperture 780 such that a vehicle connector 781 (illustrated in FIG. 2) can extend into and/or through both of the vehicle connector apertures 780 so that the member components 460A, 460B can be securely clamped about a portion of the vehicle 12, e.g., the handlebar 14. It should be appreciated that the member components 460A, 460B have an inner surface 782 that is sized and shaped to correspond with the size and shape of the portion of the vehicle 12, e.g., the handlebar 14, to which the connector assembly 16 is being connected.

Figure 8:
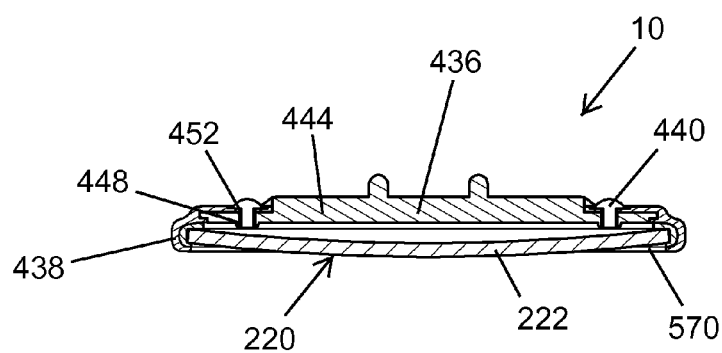
FIG. 8 is a cross-sectional view of the mirror assembly taken at line 8-8 in FIG. 5B.

FIG. 8 is a cross-sectional view of the mirror assembly 10 taken at line 8-8 in FIG. 5B. More specifically, FIG. 8 illustrates in greater detail some of the relative positioning and orientations between various components of the mirror assembly 10, as well as some of the connections and/or couplings between the components. For example, FIG. 8 illustrates the convex shape of the mirror 222, and the positioning and retaining of the mirror unit 220 between the second flange 570 and the member back 444. Additionally, FIG. 8 illustrates each of the pair of fasteners 440 extending into and/or through one of the second member apertures 452 and one of the housing back apertures 448 to selectively and/or removably secure the second housing member 438 to the first housing member 436.

It is understood that although a number of different embodiments of the mirror assembly 10 and the mirror housing 218 have been illustrated and described herein, one or more features of any one embodiment can be combined with one or more features of one or more of the other embodiments, provided that such combination satisfies the intent of the present invention.

While a number of exemplary aspects and embodiments of a mirror assembly 10 and a mirror housing 218 have been discussed above, those skilled in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A mirror housing that is configured to retain a mirror unit, the mirror unit including (i) a mirror having a perimeter, and (ii) a resilient member having an inner surface that contacts a majority of the perimeter of the mirror, and an opposing outer surface, the mirror housing comprising:
a first housing member including a member back and a first member edge that are formed with one another as a unitary structure, the first housing member being configured to selectively receive the mirror unit substantially adjacent to the member back, the first member edge being adapted to contact at least approximately 25% of the outer surface of the resilient member; and
a second housing member that is removably secured to the member back of the first housing member, the second housing member including a second member edge that is configured to contact at least approximately 25% of the outer surface of the resilient member to impart a force on the resilient member against the first member edge to inhibit movement of the mirror unit relative to the mirror housing.

2. The mirror housing of claim 1 wherein the first member edge is adapted to contact approximately 50% of the outer surface of the resilient member.

3. The mirror housing of claim 2 wherein the second member edge is adapted to contact approximately 50% of the outer surface of the resilient member when the second housing member is secured to the first housing member.

4. The mirror housing of claim 1 wherein the member back of the first housing member includes a housing back aperture and the second housing member includes a second member aperture; and further comprising a fastener that extends through the second member aperture and the housing back aperture to secure the second housing member to the member back of the first housing member.

5. The mirror housing of claim 1 wherein the second housing member is pivotally connected to the first housing member.

6. The mirror housing of claim 1 wherein one of the member edges has a generally semi-circular shape.

7. A mirror assembly comprising (i) a mirror including a front side having a reflective surface, an opposed rear side, and a perimeter; (ii) a resilient member including an inner surface that contacts a majority of the perimeter of the mirror, and an opposing outer surface; and (iii) the mirror housing of claim 1 that retains the mirror and the resilient member.

8. The mirror assembly of claim 7 wherein the inner surface of the resilient member contacts substantially the entire perimeter of the mirror.

9. The mirror assembly of claim 7 wherein the mirror is circular-shaped.

10. The mirror assembly of claim 7 wherein the first member edge includes a first flange such that at least a portion of the resilient member is positioned between the first flange and the member back when the mirror is positioned substantially within the mirror housing.

11. The mirror assembly of claim 10 wherein the second member edge includes a second flange such that at least a portion of the resilient member is positioned between the second flange and the member back when the mirror is positioned substantially within the mirror housing.

12. A vehicle including a handlebar and the mirror assembly of claim 7 that is coupled to the handlebar.

13. A mirror housing that is adapted to receive and retain a mirror unit, the mirror unit including (i) a mirror having a perimeter, and (ii) a resilient member having an inner surface that contacts a majority of the perimeter of the mirror, and an opposing outer surface, the mirror housing comprising:
a first housing member that receives the mirror unit, the first housing member including a first member edge that is configured to contact at least approximately 25% of the outer surface of the resilient member; and
a second housing member including a second member edge that is configured to contact at least approximately 25% of the outer surface of the resilient member to impart a force on the resilient member against the first member edge to inhibit movement of the mirror unit relative to the mirror housing.

14. The mirror housing of claim 13 wherein the first member edge is adapted to contact approximately 50% of the outer surface of the resilient member.

15. The mirror housing of claim 14 wherein the second member edge is adapted to contact approximately 50% of the outer surface of the resilient member when the second housing member is secured to the first housing member.

16. The mirror housing of claim 13 wherein each of the member edges has a generally semi-circular shape.

17. The mirror housing of claim 16 wherein the first housing member includes a member back, and wherein the member back and the first member edge are formed with one another as a unitary structure.

18. The mirror housing of claim 17 wherein the second housing member is removably secured to the member back of the first housing member.

19. A mirror assembly comprising (i) a mirror including a front side having a reflective surface, an opposed rear side, and a perimeter; (ii) a resilient member including an inner surface that contacts a majority of the perimeter of the mirror, and an opposing outer surface; and (iii) the mirror housing of claim 13 that retains the mirror and the resilient member.

20. The mirror assembly of claim 19 wherein the inner surface of the resilient member contacts substantially the entire perimeter of the mirror.

21. A mirror assembly comprising:
a mirror unit including (i) a mirror having a front side with a reflective surface, an opposed rear side, and a perimeter, and (ii) a resilient member including an inner surface that contacts substantially the entire perimeter of the mirror, and an opposing outer surface;
a first housing member including a member back and a first member edge that are formed with one another as a unitary structure, the first housing member being configured to selectively receive the mirror unit substantially adjacent to the member back, the first member edge including a first flange such that at least a portion of the resilient member is positioned between the first flange and the member back when the mirror is positioned substantially within the mirror housing, the first member edge being adapted to contact approximately 50% of the outer surface of the resilient member; and
a second housing member that is removably secured to the member back of the first housing member, the second housing member including a second member edge that includes a second flange such that at least a portion of the resilient member is positioned between the second flange and the member back when the mirror is positioned substantially within the mirror housing, the second member edge being configured to contact at least approximately 50% of the outer surface of the resilient member to impart a force on the resilient member against the first member edge to inhibit movement of the mirror unit relative to the mirror housing.

* * * * *